Dec. 13, 1938.  P. J. LUCAS  2,140,388
OIL FILTER
Filed May 24, 1937
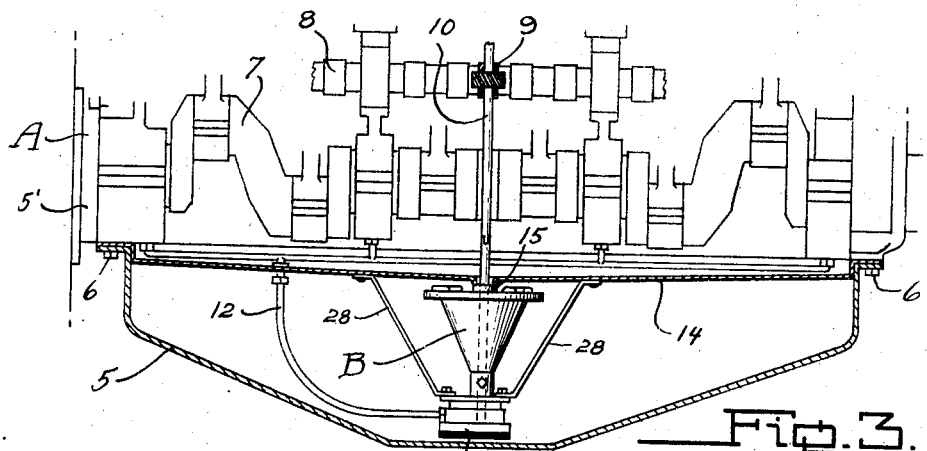
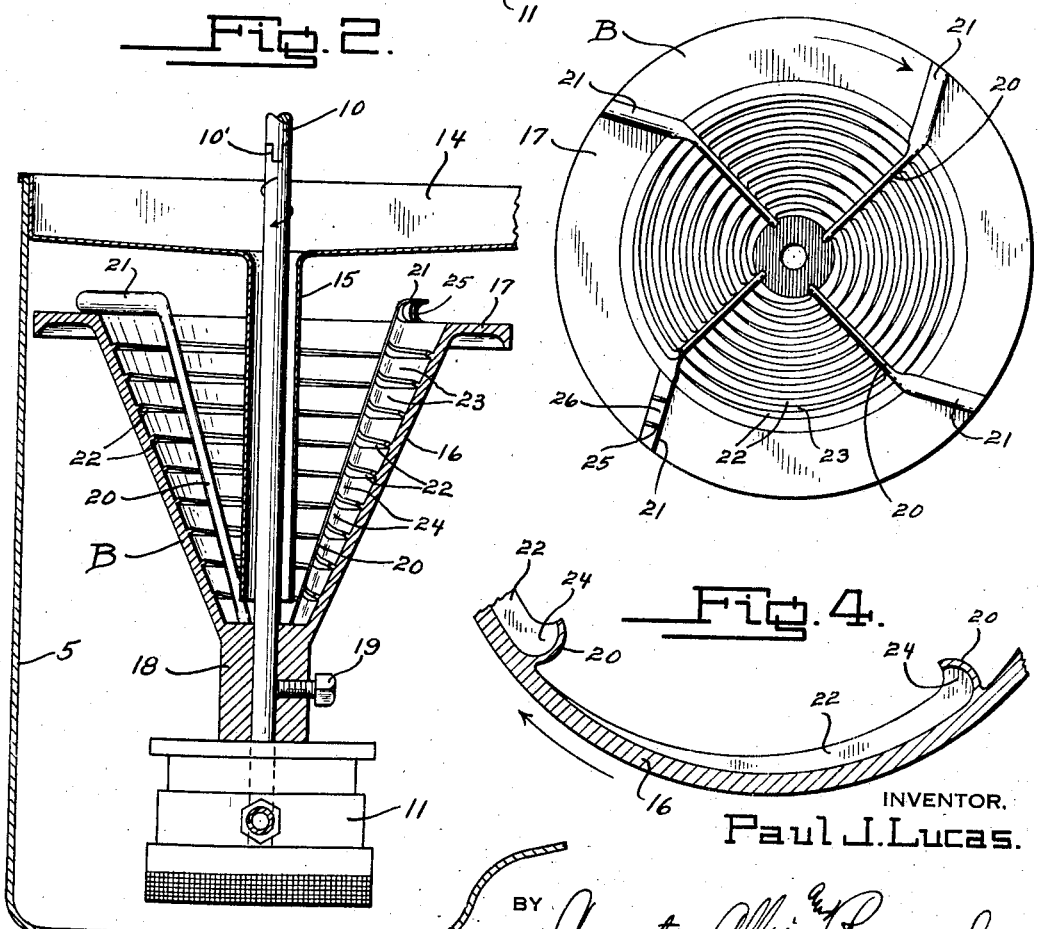
INVENTOR.
Paul J. Lucas.
BY Lancaster, Allwine & Rommel
ATTORNEYS.

UNITED STATES PATENT OFFICE 2,140,388

OIL FILTER

Paul J. Lucas, Shamokin, Pa.

Application May 24, 1937, Serial No. 144,493

4 Claims. (Cl. 233—27)

The present invention relates to filtering devices and more particularly to a device or apparatus of this character primarily adapted for the filtering or purification of lubricating oil.

The primary object of the invention is to provide an improved oil filter wherein removal of foreign matter from the oil is accomplished thru a centrifugal action.

A further object of the invention is to provide an oil filter device in which the oil is delivered at the center of a revolving separator member provided with collector means about its inner wall adapted to collect and retain foreign matter removed from the oil.

A further object of the invention resides in the provision of an oil filter device which may be attached directly to and be operated by an oil pump shaft of an internal combustion engine for removing foreign matter from the lubricating oil.

A still further object is to provide oil filtering apparatus for internal combustion engines, embodying a separator member into which the circulating lubricating oil is delivered and subjected to a centrifugal motion whereby foreign matter is removed from the oil and the cleaned oil discharged over the upper open end of the member into the oil pan or reservoir of the crank case of the engine.

Other objects and advantages of the invention will be apparent from the following detailed description, taken in connection with the accompanying drawing forming a part of this specification and in which drawing:—

Figure 1 is a longitudinal section thru the crank case of an internal combustion engine embodying the filtering apparatus of this invention.

Figure 2 is an enlarged fragmentary vertical section thru the filter and adjacent portions of the crank case and showing the manner in which the filter is mounted upon the oil pump shaft.

Figure 3 is a top plan view of the filter device.

Figure 4 is an enlarged fragmentary sectional view of the filter device.

In the drawing and wherein like reference characters designate corresponding parts throughout the several views, the letter A designates an internal combustion engine of ordinary construction having a crank case embodying the usual oil pan or reservoir 5 removably secured to the upper portion 5′ of the crank case as by bolts or the like 6. The numeral 7 designates the engine crank shaft and 8 the cam shaft provided with the usual gearing 9 serving to revolve the vertically disposed pump shaft 10, the lower end of which extends into the oil pan 5 for operating an oil pump 11 disposed adjacent to the bottom of the oil pan. The oil pump 11 is supplied by lubricating oil in the pan or reservoir 5 and this oil is delivered by the pump thru the oil distributing line 12 to the portions of the engine to be lubricated, the oil then returning to the oil pan.

Forming a partition between the upper crank case portion 5′ and the oil pan 5 is an imperforate oil pan tray 14 forming a collector for the returned oil. This oil pan tray 14 is secured about its marginal portion by the securing bolts 6 for the oil pan whereby the tray is readily removable to permit access to the engine crank shaft, etc.

Depending from the lowest portion of the slightly dished oil pan tray 14 is a tubular drain sleeve 15 which is arranged to encircle the pump shaft 10 and thru which the oil collected on the tray is adapted to flow into the improved filter device designated as a whole by the letter B. As clearly shown in Figure 2, the internal diameter of the drain sleeve 15 is slightly greater than the diameter of the pump shaft 10 thus providing an annular passage for the oil to pass downwardly about the pump shaft.

Referring now to the specific construction of the filter device or member B, the same is of general conical or funnel-like shape embodying a hollow frusto-conical shaped body portion 16 provided about its upper open end with an annular projecting flange or rim 17. Formed integral with the lower end of the body portion 16 is a mounting sleeve 18 bored to receive the pump shaft 10 and provided with a set screw or bolt 19 whereby the filter device is secured for rotation with the pump shaft.

Provided in the body portion 16 is a collector means which is adapted to remove foreign matter from the oil and deliver the cleaned oil over the upper open end of the filter into the oil pan or reservoir 5 thru rotation of the filter. Provided on the tapering inner wall of the frusto-conical like body portion 16 and extending thruout the length of the slant height or side of the body portion is a series of evenly spaced apart ribs 20 of arcuate shape in cross section and having their concaved sides facing in the direction of rotation of the filter. The upper ends of these ribs 20 have correspondingly shaped rib portions 21 which extend across the upper surface of the rim 17 at a slight tangent to the diameter of the rim and as shown in Figure 3 extend at a rearward angle with respect to the direction of rotation of the filter.

Arranged on the inner wall of the body portion 16 and extending between each of the ribs 20 is a plurality of parallel spaced apart fins 22 which are disposed thruout the height of the body portion and provide a plurality of arcuate oil channels 23 of gradually increasing length from the bottom to the top of the body portion. These fins 22 as will be observed in Figure 4 extend from the concaved side of their respective ribs 20 in the direction of rotation of the filter with the edges of the fins gradually tapering off and merging into the inner wall of the body portion adjacent to the convex side of the adjacent rib whereby the oil channels 23 gradually increase in depth toward the concaved side of their respective ribs and in a direction opposite to the direction of rotation of the filter. Thus the fins 22 where they join with the concaved side of the ribs 20 provide a series of cupped pockets 24 along each rib which face in the direction of rotation of the filter and which are concentrically arranged in circles of increasing diameter toward the upper end of the body portion. The upper offset end portions 21 of the ribs 20 are provided in their concaved side with small fins 25 providing shallow pockets 26 in these offset portions.

As shown in Figure 2, the filter device B is adapted to be mounted upon the oil pump shaft 10 directly above the oil pump 11 with the upper open end of the filter spaced slightly below the oil pan tray 14 and with the tubular drain sleeve 15 extending axially downwardly into the tapering body portion 16 to a point closely adjacent to the bottom thereof whereby the oil is delivered from the sleeve into the smaller lower end of the filter body portion. The oil pump 11 may be secured in place in any preferred manner for operation by the shaft 10 and in the example shown, braces 28 are provided for supporting the pump from the oil pan tray 14. By providing a spline connection as at 10' in the pump shaft 10, permits for the removal of the filter and pump as a unit with the oil pan tray when such becomes necessary.

In the operation of the filter apparatus, when the engine A is running, the pump shaft 10 will be constantly rotated by the gears 9 from the cam shaft 8 for operating the oil pump 11 whereby lubricating oil in the oil pan or reservoir 5 is picked up and delivered thru the distributor line 12 to operating portions of the engine for lubrication thereof. The oil returning from these points of lubrication, together with any foreign abrasive matter with which the oil may have become contaminated, falls upon the upper surface of the oil pan tray 14 and drains to the tubular drain sleeve 15. With the filter device B rotating in the direction of the arrow as shown in Figure 2, the oil passes down thru the tubular drain sleeve 15 about the pump shaft 10 and is delivered into the lower smaller end of the tapering filter body 16. This oil delivered into the filter body is picked up and subjected to a centrifugal action by the ribs 20 causing the oil to be forced outwardly against the inner surface of the filter body and also a tendency to rise due to the upwardly flaring shape of the filter body. This upward travel of the oil is retarded by the fins 22 which cause the oil to travel substantially horizontal in the oil channels 23 towards the concaved or channeled ribs 20. During this upward travel of the oil, any heavy particles in the oil are forced by centrifugal force against the inner wall of the filter body and are retained in the cupped pockets 24. The cleaned oil, free from foreign matter is then discharged over the rim 17 at the upper open end of the filter and into the oil pan or reservoir 5 where it is picked up by the pump 11. Any foreign particles which have not been collected in the pockets 24 will be caught in the pockets 26 on the rim 17.

Thus it will be seen that the filter device B forms a link in the oil circulating system which will, whenever the pump is operating, act to filter the lubricating oil being circulated thru the system. While the filter has been shown associated with an internal combustion engine for filtering the lubricating oil of the engine, the device is of course not limited to this specific use and may be used for filtering various other liquids. It is also to be understood that the angle of the wall of the conical-shaped body portion of the filter may vary from that shown in the drawing.

Changes in details may be made to the form of invention herein shown and described without departing from the spirit of the invention or the scope of the following claims.

I claim:

1. A filter comprising a body portion having a fluid receiving conical surface, means for rotating the body portion for directing fluid against said conical surface, and a series of concentrically arranged segmental collector channels in superposed relation on the conical surface and each terminating in a cupped pocket opening in the direction of rotation of the filter.

2. A filter comprising a conical-shaped body portion having an inner conical surface, means for rotating the filter, a series of cupped ribs extending in upwardly diverging relation along the slant height of the inner conical surface of the body portion, and a plurality of spaced apart fins arranged between the ribs and providing arcuate channels each terminating at one end in a cupped pocket at said ribs.

3. A filter comprising a body portion having an inner conical surface, means extending axially of the conical surface for rotating the filter, a series of inwardly projecting ribs of arcuate shape in cross section, extending in upwardly diverging relation thruout the length of the slant height of the inner conical surface of the body portion, and a plurality of spaced apart arcuate fins extending inwardly from the conical surface between adjacent ribs, said fins having tapered edges and being of greatest width at their ends adjacent to the concaved side of the ribs.

4. A filter comprising a funnel-like body portion having an outturned rim at its upper open end, means for rotating the filter, a series of channeled ribs extending in upwardly diverging relation along the inner wall of the body portion and having upper portions continuing across the upper side of said rim, pockets formed in said upper portions of the ribs, and a plurality of spaced apart fins extending between adjacent ribs and forming arcuate channels terminating at one end in the channeled side of the ribs.

PAUL J. LUCAS.